(No Model.)
L. E. EVANS.
TRAVELING BOX FOR DOGS.
No. 315,925. Patented Apr. 14, 1885.
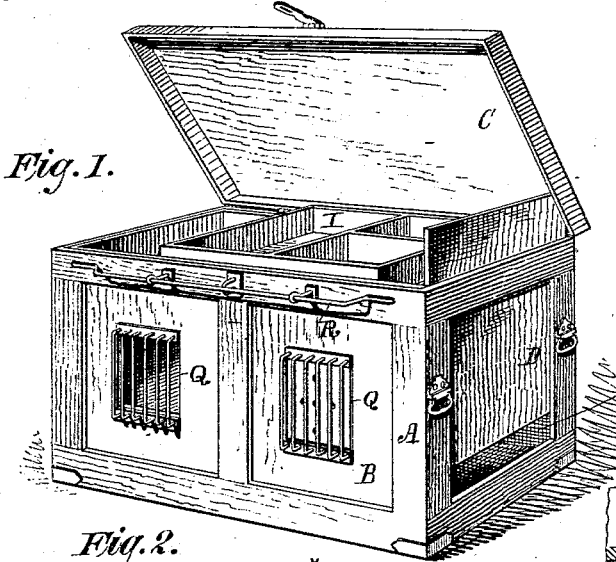
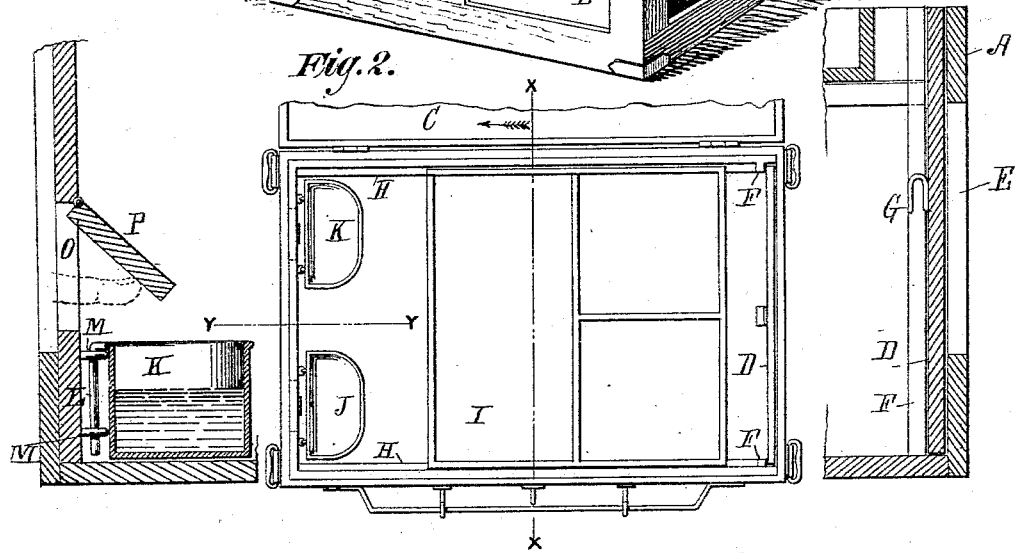
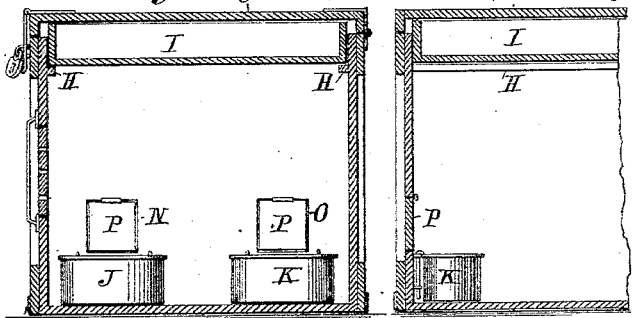
WITNESSES:
Gustave Dieterich
John J. Bowen
INVENTOR
Lemuel E. Evans
BY
Park Benjamin
ATTORNEY

UNITED STATES PATENT OFFICE.

LEMUEL E. EVANS, OF EAST ORANGE, NEW JERSEY.

TRAVELING-BOX FOR DOGS.

SPECIFICATION forming part of Letters Patent No. 315,925, dated April 14, 1885.

Application filed December 27, 1884. (No model.)

*To all whom it may concern:*

Be it known that I, LEMUEL E. EVANS, of East Orange, Essex county, New Jersey, have invented a new and useful Improvement in Traveling-Boxes for Dogs, of which the following is a specification.

The invention relates to an improved box or case in which dogs or other small animals may be confined during shipment on railways, &c.

The invention consists in a strong, compact, and durable box or case, especially adapted to the conveyance of dogs and other animals of value, constructed and arranged so that the animal may be conveniently put into said box and removed therefrom, so that food and drink may be given without actual access to the animal, and so that the necessary brushes, blankets, and other appurtenances may be stowed therein. Means are also provided for adequate ventilation and for preventing close contact of the sides of the case containing the ventilating openings with adjacent objects.

In the accompanying drawings, Figure 1 is a perspective view of my improved traveling-box. Fig. 2 is a plan view. Fig. 3 is a transverse section on the line $x\ x$ of Fig. 2. Fig. 4 is a partial longitudinal section on the line $y\ y$ of Fig. 2. Fig. 5 is an enlarged partial longitudinal section of one end of the box, showing the arrangement of food-vessel and inwardly-swinging door giving access thereto. Fig. 6 is an enlarged partial longitudinal section of the opposite end of the box, showing the arrangement of the vertically-sliding door.

Similar letters of reference indicate like parts.

The box or case is preferably constructed of a strong frame, A, provided with sunken panels B. To said box is hinged a lid, C. The box and lid are provided with a hasp and staple to be used with a padlock, or any other suitable means may be employed for securing the lid when shut down.

In one end of the box A the panel D forms a vertically-sliding door, closing the opening E. This panel is held in place by bars F inside the box, the said bars together with the adjacent parts of the frame forming vertical grooves or channels, in which the panel may freely slide. On the inner side of the panel D is secured a projection or hook, G, for conveniently raising said panel. The object of the opening E is to allow of the convenient introduction of the animal into and its removal from the box. When the panel or door D is in place, the shutting and locking of the lid C prevents it from being raised.

Near the upper edge of the box and within the same are longitudinal bars H, resting upon which is the loose tray I. This tray may be slid to and fro upon the bars H, so as to allow of convenient access to all parts of the interior of the box when the lid is lifted. The tray is here shown divided into compartments for the reception of brushes, blankets, and other appurtenances of the animal. The lid C when closed covers the tray closely and prevents the contained articles from falling out.

Within the box are placed vessels J and K, for containing food and drink for the animal. Any convenient means may be provided for securing these vessels detachably in the box—such, for example, as the rod L and eyes M.

Above the vessels J K and in the end of the box are formed openings N O. Each opening is provided with a swinging door, P, which may be swung inwardly only, as shown in Fig. 5, in order to introduce food and water through the openings N O into the vessels J K.

In the side of the box are made ventilating-apertures Q, provided with gratings, as shown, and a guard-bar, R, is arranged to prevent contact with the side of the box with other objects, and to protect the lock or fastening.

I claim as my invention—

1. The combination of the box, lid C, opening E, and sliding door D, substantially as described.

2. The combination of the box, lid C, and at one end of said box the opening E, provided with a sliding door, D, and at the other end of said box the opening N, provided with an inwardly-swinging door, P, and food-vessel, substantially as described.

3. A traveling-box for animals, containing a lid, sliding tray I, opening E, door D, opening N, door P, food-vessel, and ventilating-apertures, substantially as described.

LEMUEL E. EVANS.

Witnesses:
JOHN J. BOWEN,
T. J. KEANE.